Sept. 2, 1952 P. WIRZ 2,609,142

TURBINE WHEEL

Filed April 17, 1946

Paul Wirz
INVENTOR

BY
ATTORNEY

Patented Sept. 2, 1952

2,609,142

UNITED STATES PATENT OFFICE 2,609,142

TURBINE WHEEL

Paul Wirz, Berne, Switzerland

Application April 17, 1946, Serial No. 662,695
In Switzerland August 10, 1944

Section 1, Public Law 690, August 8, 1946
Patent expires August 10, 1964

1 Claim. (Cl. 230—134)

This invention relates to a process for manufacturing sheet metal bodies having parts which stand at angles to each other, for instance fan-wheels for centrifugal ventilators. In manufacturing sheet metal bodies of this type single plate parts which stand at an angle to each other are rigidly joined, apart from welding, soldering, or riveting, by means of tongues of the one part which penetrate from one side through slits in the other part and which are deformed on the other side of the slits. By connecting the sheet metal parts in the cited manner, no essential stiffening or strutting of the parts directly joined will be obtained, wherefore this simple and cheap method of connecting sheet metal parts was hitherto not suitable for parts which have to stand mechanical stresses, such as those caused by lateral pressure, for instance.

To remove this inconvenience the present invention proposes a new process for manufacturind sheet metal bodies of the above defined class, said process being set forth in the following description, defined in the appended claim and illustrated by way of example in the accompanying drawing wherein—

Figure 1:
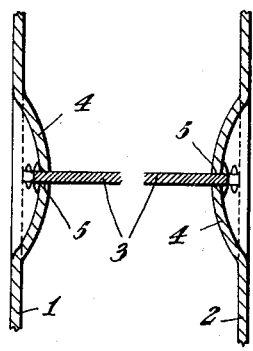
Fig. 1 is a sectional view of the first embodiment of a metal sheet body manufactured according to the invention.

In Fig. 1 the reference characters 1 and 2 indicate two parallel plates, respectively, which are rigidly joined by a cross plate 3. First of all, a dishing 4 is pressed into each of the two plates 1 and 2, which dishing is cambered towards the lateral edge of the cross plate 3 and has preferably the shape of a spherical calotte, as illustrated in Fig. 1. Each calotte or blister 4 is provided with a slit 5, for instance by milling or stamping. Then, the cross plate 3 is inserted with its respective lateral abutting edges into the slits 5 of the plates 1 and 2, respectively, the slits being preferably of such width that the cross plate edges are jammed therein. Finally, the edge portions of the cross plate 3 which protrude on the concave side of the calotte or blister 4 will be deformed, for instance by upsetting them, in order to anchor the cross plate to the plates 1 and 2. The calottes or blisters 4 support the cross plate 3 along the whole length and height of the slit 5, so that the anchoring is consolidated and the mutual connection of the plate-body parts on both sides is essentially stiffened.

Figure 2:
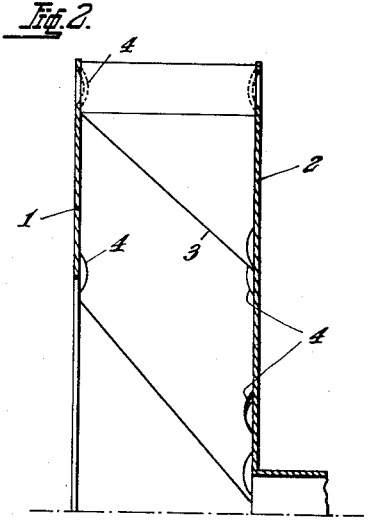
Fig. 2 is a sectional view of the second embodiment constituted by a fractional portion of a rotor wheel for centrifugal ventilators.
Figure 3:
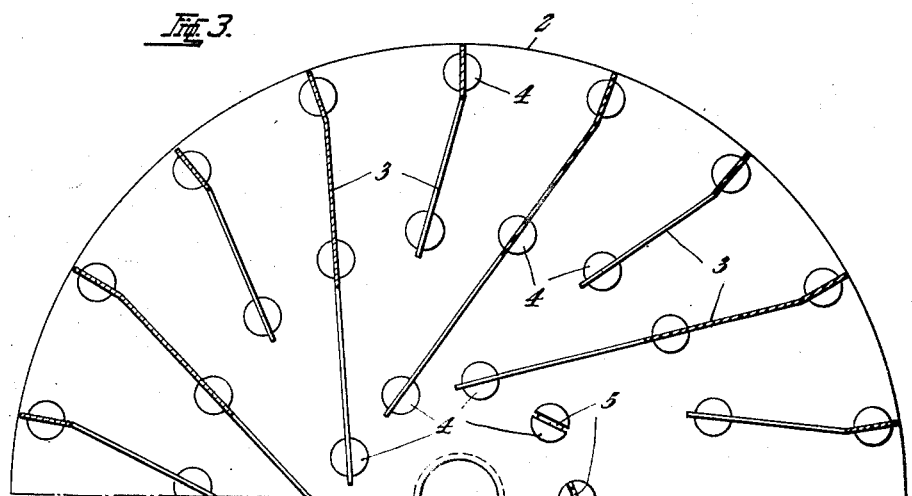
Fig. 3 is a sectional view of the fractional portion of the rotor wheel shown in Fig. 2, transversally to the rotor axis.

The process is particularly suitable for manufacturing rotor or fan wheels for centrifugal ventilators. Figs. 2 and 3 illustrate a fraction of such a fan wheel made of light sheet metal which is extraordinarily thin for the cited usage. Both rotor disks 1 and 2 have formed thereon two and three rows, respectively, of dished calottes 4 regularly arranged along concentric circles around the rotor axis, which calottes are cambered towards the inner side of the wheel. Each calotte is provided with a slit, which may run in radial direction or under any convenient angle thereto. The blades 3 are inserted with their abutting edges into these slits and the edge portions protruding from the concave side of the calottes are anchored thereto by deforming them. The abutting edges of the blades will thus be secured to each rotor disk in one or several places and essentially be stiffened by means of the calottes or blisters, so that the stresses on blades and wheel disks, which are caused by lateral pressures arising when the rotor wheel is running, have no influence upon the mutual position of blades and wheel disks and, therefore, no deformation of the rotor wheel is to be feared.

It is obvious that rotor wheels manufactured exclusively of light metal sheets of 1 millimeter thickness for instance, according to the process described herebefore, will have a far smaller weight than those made of sheet iron or cast iron and that they afford best conditions, as far as starting conditions and vibration-free rotation are concerned. Even rotor wheels manufactured of sheet iron according to this process are subject to a considerable reduction of weight, as the better mutual connection of the sheet walls allows the use of substantially thinner plates for that purpose. Moreover, the present invention makes it possible to mill the slits in the elevations, while in constructions known before milling was impossible and the slits had to be stamped out.

Considering in addition, that there are not needed any fastening tongues on the blades, material and machining are reduced by manufacturing according to the above described process.

Tests have proved that rotor wheels manufactured according to this process are equally suitable for low, middle and high pressure ventilators.

The described process is also applicable for construction of any kind of guide blading, as for instance in anemometers.

What I claim is:

A turbine wheel for medium and high pressure centrifugal ventilators, having comparatively thin sheet metal blades and comparatively thin sheet metal side plates, comprising a plurality of angularly spaced blisters of substantially spherically curved shape in said side plates, slits in said blisters diametrically disposed to accommodate the edges of respective blades, for engaging each of said blades there are provided at least three of said blisters, and each blade forming a knee which extends transversally from one side plate to the other and is positioned out of the reach of any of said blisters but with respect to the side plate circumference at least internally from the outermost blister engaging said blade, whereby said blades are in contiguity with the sides of said slits and wherein said blisters face inwardly of said wheel towards said blades with a portion of the opposed edges of said blades protruding through the convex sides and into the concave sides of respective blisters, said portions being upset and thickened to a degree greater than the original slit width, the portion of said blade edges in contiguity with the sides of the respective slits being thus strongly gripped therein.

PAUL WIRZ.

REFERENCES CITED

The following references are of record in the file of this patent:

UNITED STATES PATENTS

| Number | Name | Date |
|---|---|---|
| 1,119,713 | Moss | Dec. 1, 1914 |
| 1,637,652 | Ness | Aug. 2, 1927 |
| 1,876,518 | Mathis | Sept. 6, 1932 |
| 2,125,697 | Swingle, et al. | Aug. 2, 1938 |
| 2,157,441 | Sullivan | May 9, 1939 |
| 2,302,095 | Bartch | Nov. 17, 1942 |
| 2,345,918 | Dahlstrand | Apr. 4, 1944 |
| 2,349,921 | Wemp | May 30, 1944 |
| 2,380,276 | Warren | July 10, 1945 |